Patented July 19, 1927.

1,636,420

UNITED STATES PATENT OFFICE.

MORRIS KASSER, OF SAN FRANCISCO, CALIFORNIA.

PROCESS FOR TREATING EGGS.

No Drawing.   Application filed March 11, 1925.   Serial No. 14,784.

This invention relates to the treatment of eggs whereby they are caused to have not only long keeping qualities, but also a good appearance.

It is now quite common to "process" eggs by applying hot oil of the proper kind to the egg. It has been found that by proper manipulation of the process, eggs so treated can be placed in storage for long periods.

As heretofore accomplished, the processing of eggs alters their appearance to such an extent that such processed eggs can very easily be detected, even when the egg is otherwise of the best quality. This is due to the fact that the egg acquires, due to the process, a shiny appearance and a greasy feel, occasioned by the retention on the shell exterior, of a thin film or layer of oil. Another very serious disadvantage is that dust falling on the oil coating adheres very strongly to it, thereby imparting to it a dirty appearance; and of course bacteria can thus be lodged on the egg; with the attendant obvious danger. Especially is this the case where sticky substances, such as resins, gum, paraffine, or wax are mixed with the oil preservative, even in minor quantities.

It is one of the objects of my invention to make it possible to produce a processed egg without the shine.

It is another object of my invention to provide a novel preserving material, serving as a substitute for the oil heretofore used.

It is still another object of my invention to provide an inexpensive process for preserving eggs and for causing them to retain their natural external physical characteristics.

My invention possesses many other advantages, some of which with the foregoing will be set forth at length in the following description, where I shall outline in full several forms of the process embodying my invention. This detailed description, however, is used only for explanatory purposes; and the scope of my invention can best be ascertained from the claims appended hereto. It will be evident from a perusal of these claims that I am not limited to the forms of the process described, nor to the materials specified for use in the process.

My process can be applied to the eggs after they have been treated with an oil preservative; either immediately upon such treatment, or at the time the eggs are removed from storage. It comprises applying a volatile liquid to the shell, which liquid is also a solvent for oil. Such a compound can be artificially produced, but I find it preferable to make use of material already available, such as certain hydrocarbon minerals. One such mineral which is a product of oil refineries and can be procured with facility, is petroleum ether. Such material includes a highly volatile hydrocarbon constituent as well as a hydrocarbon acting as an oil solvent. It is not necessary to detail all the constituents of such a compound, for a wide variation is permissible, and it can be used as it is commonly obtained in the process of oil refining, without regard to exactness in proportions. When treating the eggs with this material, the shine is very quickly removed; the oil dissolved quickly drains off, and the residue left on the egg is very quickly evaporated, leaving no residual odor. When so treated, a processed egg cannot be recognized among other eggs not processed.

The manner of application of the oil remover to the egg shell is preferably by spraying the egg; but it is possible to produce substantially the same results by dipping, or immersing the eggs, or by pouring the remover over them; or in fact by any manner of applying the remover to the shell. A very short time suffices for the immersion to remove the shine, by actual observation it is found that a few seconds, at ordinary room temperatures, are sufficient.

When using the immersion process, it is preferable to use several successive short dippings; whereby little if any oil will be allowed to drain back into the remover, but it is instead drained off outside of the liquid, and thereby its effectiveness is not reduced. This can also be accomplished by immersion of the egg just sufficient to moisten it, and by spraying the egg with the remover while the egg is still wet.

Although it is preferable to use petroleum ether, other compounds having similar properties can be used; for example, paraffine ether. In such case, a slight residual odor is apt to remain; but this can be overcome by mixing a deodorant with the remover, or by applying a deodorant in any other way. When petroleum ether is used, however, the remover evaporates or dries so rapidly that there is no opportunity for it to penetrate into the egg, and it is unnecessary to use such a deodorant.

In ordinary cases, the shine can be removed when using the liquid as specified without the aid of heat. Some eggs however, are processed or preserved by the use of an oil preservative in which some rosin, resin, gum, paraffine, wax, or the like is dissolved; and this causes the coating of oil to adhere more firmly to the egg shell. Under such circumstances, it is advisable to warm the remover slightly while treating the eggs with it. Comparatively low temperatures are desirable in order that the keeping qualities be not impaired.

This treatment of the eggs as described can be accomplished immediately after the eggs are processed and before the oil thereon has an opportunity of hardening; or else the treatment is accomplished at any other future time, such as when they are removed from storage to be sold. Under either circumstance, the shell exterior is subjected to a remover that is a germ destroying medium, since I have found that such liquids as petroleum ether or paraffine ether have this desirable properties.

It is especially to be noted that by the aid of my treatment described, the egg exterior is left in a natural state; nothing is added or subtracted. I am aware that eggs have heretofore been subjected to sand blasts to remove the shine; but this treatment reduces the shell thickness, and this in turn impairs the keeping qualities. Washing or whitewashing the eggs to deaden the shiny surface, is also injurious, for then the eggs must be subjected to water and temperature, both acting adversely on the egg. Powdering to secure the same results, does not remove the oil, but merely covers it up, and the powder can easily be detected. As distinguished from such prior processes, my treatment removes the objectionable oil coating without harming the shell, thereby imparting natural appearance and feel to it. Furthermore a sterilization of the egg exterior is simultaneously effected. At the same time, the oil solvent while it removes the shine, need not necessarily disturb the oil in the shell pores, so that the egg still retains to a large extent, its keeping qualities. This is due to the fact that the length of treatment is just sufficient to remove the shine. In fact, since this operation is usually accomplished after the eggs are taken from storage, they no longer need to have extraordinarily long keeping qualities, for they are kept only long enough for marketing.

Thus far I have concerned myself only with the treating of eggs which have already been processed by the use of an oil preservative. However, it can equally well be used simultaneously with the oil treatment. For this purpose, I have evolved a new compound for treating fresh eggs, which not only imparts the usual keeping qualities thereto, but also leaves no shine. This I accomplish by adding a small portion of oil (mineral, vegetable or animal or a mixture thereof, as desired), with petroleum ether or its equivalent. The proportion is of the order of one part of oil to ten, thirty, forty, or even one hundred parts of the petroleum ether; the proportions being limited only by the amount of time it is desired to preserve the eggs so treated. This new compound is used as a substitute in the old processes of the oil preservative. It has many advantages over such a preservative, some of which will now be set forth. In the first place, such a compound is a better germ destroyer than oil alone. Furthermore the eggs acquire no shine to any perceptible extent, and the eggs can be used without further treatment in such places as high grade restaurants, where appearance of the egg is of prime importance.

The use of such a compound as a preservative obviates a further serious objection to the use of the oils now commonly done. When the eggs are treated with oil, they are often placed on the flats and in the egg crate fillers while the oil on the shell is still damp. This stains the fillers and the flats, and they can therefore be used but once. One way of obviating this is by drying the eggs carefully, but this is expensive. With the new preservative as described, the moisture evaporates so quickly that there is no danger of spotting the fillers or flats when placing the eggs in the crates. This is due to the highly volatile nature of the preservative.

The physical manipulation of the eggs with this new preservative may be entirely similar to that used in connection with the other forms. For example, the preservative may be applied by dipping or immersing the eggs for a few seconds in a tank to which heat is applied; or alternately, a spray of the heated preservative is used. Although it is now common in this art to preserve eggs by using temperatures varying from normal to about 260° F., I find that with my process a comparatively cool solution serves the purpose well. This I attribute to the germicidal qualities of the preservative used, which together with the oil content serving as a carrier or adherent for the volatile substance, checks effectively and for a long interval, any tendency for the egg to spoil.

When using the described process either for removing the shine or for preserving, it is possible to add a small proportion of some chalky powder, such as finely divided magnesia, to the liquid. The finely divided material is deposited on the egg and a whiter or deader color is secured, which is so highly desirable. The proportion of powder however should be so slight as to escape detection. It is of course also possible to use a small proportion of resin, wax, paraffine or the like in the preserving process.

I claim:

1. The process of treating eggs having a shiny and oily shell, which comprises treating the shell with a liquid compound that is both an oil solvent and volatile, for removing the shine, and is incapable of penetrating the egg shell and tissue to give taste and odor to the egg content.

2. The process of preserving eggs which comprises applying to them a compound of petroleum ether, and a small proportion of oil.

3. The process of treating eggs having an oily and shiny shell, which comprises treating the shell with a warm liquid including a volatile solvent of such character that it is incapable of imparting taste and odor to the egg content.

4. The process of preserving eggs that are to be deposited on flats and in fillers, which comprises applying to them a heated volatile or quick drying liquid that leaves no stain.

5. The process of preserving eggs that are to be deposited on flats and in fillers, which comprises applying to them a preservative liquid that leaves no stain when it dries.

6. A compound including a volatile solvent that will spread a sealing substance freely and leave no odor or taste in the egg.

In witness whereof, I have hereunto set my hand.

MORRIS KASSER.